Figure 4:
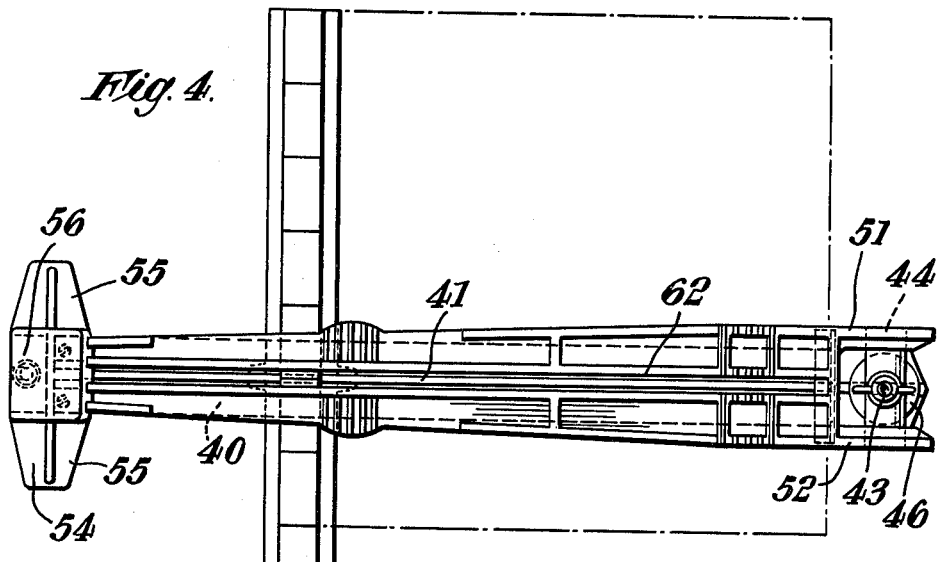

United States Patent [19]

Chrismas

[11] 4,084,569

[45] Apr. 18, 1978

[54] TILE CUTTER

[76] Inventor: Alan Gould Chrismas, 8 Cleveland Close, Worthing, West Sussex, England

[21] Appl. No.: 686,818

[22] Filed: May 17, 1976

[30] Foreign Application Priority Data

May 20, 1975 United Kingdom ............... 21387/75

[51] Int. Cl.² ............................................. B28D 1/32
[52] U.S. Cl. .................... 125/23 R; 33/32 B; 225/96.5; 225/103
[58] Field of Search ........................ 225/96.5, 103, 2; 125/23 R, 40; 33/32 R, 32 B, 32 C, 99, 100, 101

[56] References Cited

U.S. PATENT DOCUMENTS

| 840,928 | 1/1907 | Gamston et al. ............... 33/32 X |
| 1,873,721 | 8/1932 | Postley ........................ 125/23 R |
| 2,205,717 | 6/1940 | Fedon ......................... 125/23 R |
| 2,814,163 | 11/1957 | Krulwich ..................... 225/96.5 X |
| 3,371,833 | 3/1968 | Sutton ......................... 225/96.5 X |
| 3,439,426 | 4/1969 | Wilson ......................... 33/32 B |
| 3,963,159 | 6/1976 | Krulwich ........................ 225/96.5 |

*Primary Examiner*—Frank T. Yost
*Attorney, Agent, or Firm*—Lynn L. Augspurger

[57] ABSTRACT

The invention relates to tile cutters and provides a tool for cutting glass and ceramic tiles. The tool can be used both to guide a scriber for scoring the surface of the tile and also to provide the necessary bending stress to snap the tile along the score line. The tool comprises a base member and an arm hinged thereto, a ridge being formed on the top of the base member. The arm includes a slot for guiding the scriber and at least one pair of shoulders located on either side of the slot. The slot is held parallel to the ridge so that the shoulders are located on either side of the ridge. When pressure is applied to the arm with a tile resting on the base member, bending stress is applied to the tile by the ridge acting on one side of the tile and the two shoulders acting on the other side of the tile.

20 Claims, 6 Drawing Figures

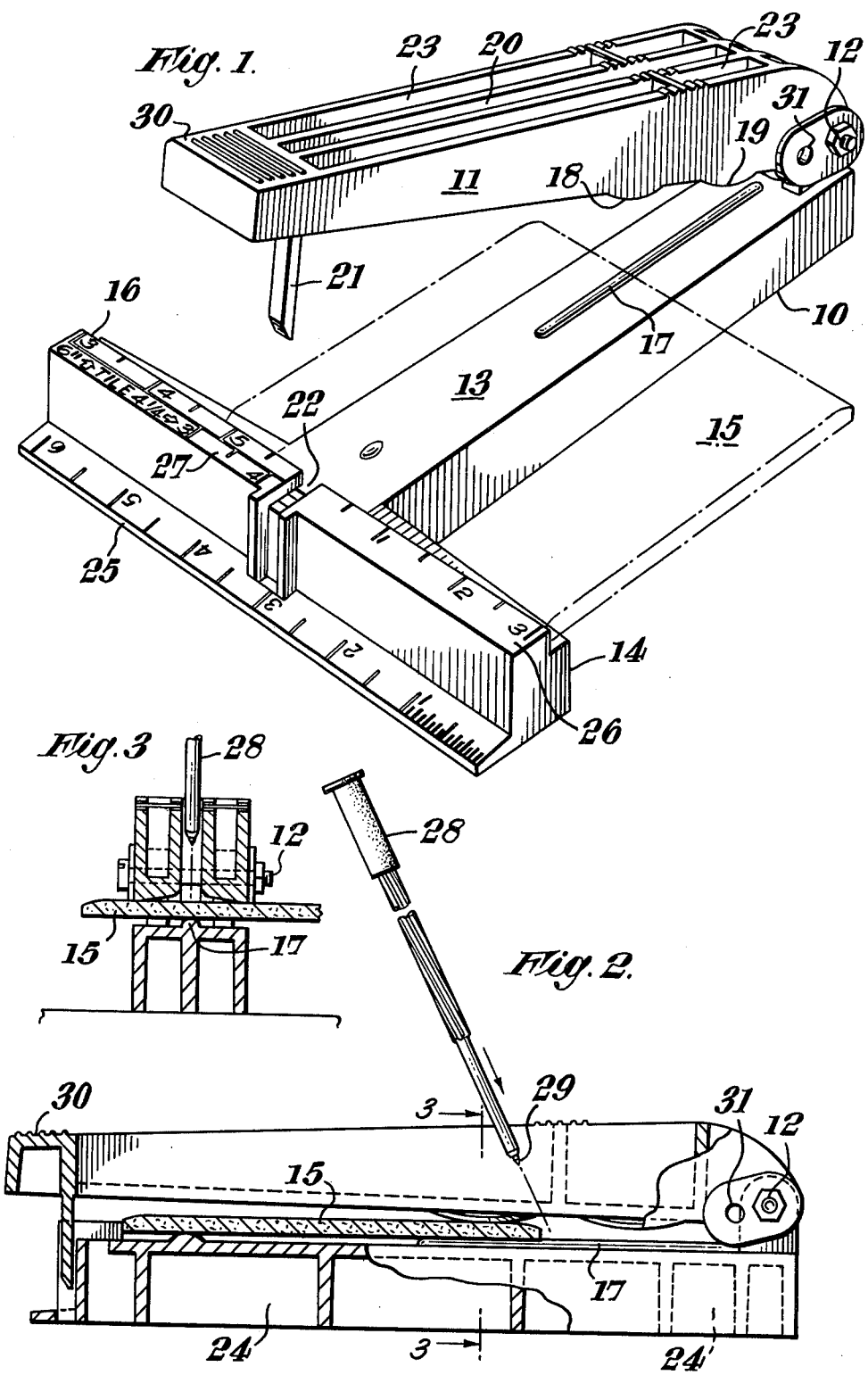

TILE CUTTER

This invention relates to tile cutters and it is an object of the invention to provide a tool which can conveniently be used for cutting glass and ceramic tiles.

It is well known that in cutting such tiles it is necessary first to score one surface of the tile along the line of the required cut and thereafter to apply a bending stress to the tile to cause it to snap along the line of the score.

Various tools have been designed to facilitate this process, but in most known tools it is necessary to reposition the tile after the score has been made and before the bending stress is applied. Other known tools are designed merely to provide the bending stress and alternative arrangements must be used for producing the score.

It is therefore a particular object of the present invention to overcome the disadvantages of known tools as described above.

From one aspect, the invention consists in a tile cutter including a longitudinally extending base member and an arm hingedly connected to said base member at one end thereof, a ridge upstanding from a surface of said base member and extending along a portion of said base member from the region of said one end, a slot extending along said arm from the region of the hinge connection, and a pair of shoulders dependent from said arm on either side of said slot and extending along a portion of said arm from the region of said hinge connection, the arrangement being such that during hinging motion of said arm the slot remains substantially parallel to the ridge on the base member.

In using a tile cutter in accordance with the invention, the tile to be cut is placed on the base member being positioned so that the line of the desired cut is located immediately below the slot in the arm. The arm is then moved down so that the tile is gripped between the shoulders on the arm and the ridge upstanding from the base member. The score is made by inserting a suitable tool in the slot and drawing it along the length of the slot in contact with the tile. Thereafter, the pressure on the arm is increased so that the shoulders and the ridge together apply a bending force to the tile, causing it to snap along the line of the score.

Preferably, the ridge extends along the base member for a distance between one half and one third of the length of the desired cut. Preferably, the two shoulders are curved and, in particular, it is prefered that the surface of each shoulder adjacent to the base member should be defined by an arc of a circle so that there is always substantially line contact between the shoulders and the tile when pressure is applied to the arm.

Preferably, means are provided to ensure that the slot remains parallel to the ridge when the cutter is being used. Such means may be constituted, for example, by a spigot depending from the region of the end of the arm opposite said one end and engaging in a corresponding hole in the base member.

Preferably, the base member incorporates locating means for the tile to be cut and said locating means may include a gauge or the like to indicate the distance of the cut from one or more edges of the tile.

In particular, the base member may be generally T-shaped, thus including two mutually perpendicular longitudinally extending portions. The first of these portions carries the arm which is pivoted to the end of this portion remote from the second portion. The second portion has an upstanding shoulder, which extends perpendicular to the longitudinal axis of the first portion and serves as an abutment for locating the tile to be cut. The second portion also carries at least one scale to indicate the distance in both directions from the longitudinal axis of the first portion.

One particular embodiment of the invention is designed for cutting tiles which are 4¼ inches square and in this case the scale preferably commences from 0 and extends up to 2.⅛ inches in one direction and from 2.⅛ to 4¼ inches in the opposite direction. If desired, the second portion may be additionally supplied with a normal measuring scale commencing from 0 at one end and extending up to 4¼ inches at the other end.

A tile cutter in accordance with the invention may consist primarily of a relatively rigid synthetic resin material, the hinge being constituted, for example, by a metal pin.

Figure 5:
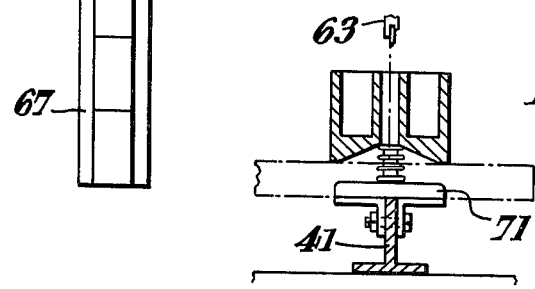
Figure 6:
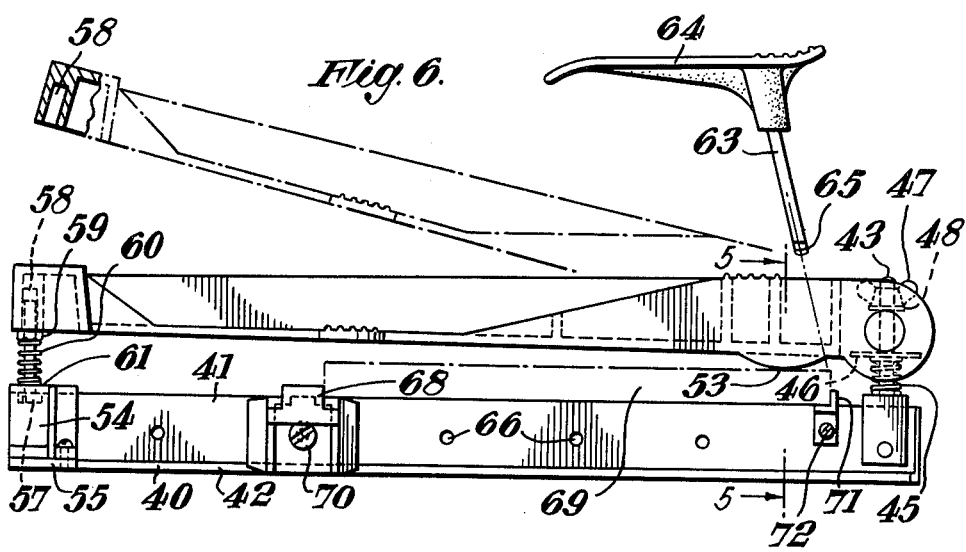

Methods of performing the invention will now be described with reference to the accompanying diagrammatic drawings in which:

FIG. 1 is a perspective view of a first embodiment of the invention,

FIG. 2 is a side view partly in section of the tile cutter illustrated in FIG. 1, FIG. 3 is a cross-sectional view of a part of the tile cutter illustrated in FIGS. 1 and 2, FIG. 4 is a plan view of a second embodiment of the invention, FIG. 5 is a cross-sectional view of a part of the tile cutter illustrated in FIG. 4, and FIG. 6 is a side view partly in section of the tile cutter illustrated in FIGS. 4 and 5.

FIGS. 1, 2 and 3 of the drawings illustrate a tile cutter which is suitable for cutting 4¼ inches and 6 inches ceramic wall tiles. The cutter illustrated includes a base member 10 and an arm 11 hingedly connected together by means of a nut and bolt 12. The base member 10 is generally T-shaped including a first portion 13 to which the arm is hinged and a second portion 14 for locating a tile 15 to be cut. For this purpose the portion 14 includes a shoulder 16 against which the tile 15 abuts. The tile 15 illustrated represents a 4¼ inches square tile and it will be seen that the distance between the shoulder 16 and the hinge connection is substantially greater than the size of the tile illustrated since it is intended to be large enough to accommodate a tile which is 6 inches square.

The upper surface of the base 10 is provided with an upstanding ridge 17 and the arm 11 is provided with two pairs of dependent shoulders 18 and 19. The shoulders 18 are positioned so that they engage a 4¼ inches tile in the region of one edge thereof when the tile is located with the opposite edge against the shoulder 16, while the shoulders 19 are positioned so that they engage a 6 inches tile in the region of one edge thereof when the tile is similarly treated. The arm 11 is also provided with a central slot 20 and a spigot 21 which engages in a recess 22 in the second portion 14 of the base member 10 to ensure that the arm remains parallel to the base when the shoulders 18 or 19 are in contact with the tile to be cut.

The tile cutter illustrated is made of a synthetic resin material and to reduce the amount of material used, the arm 11 is provided with a plurality of recesses 23. Further the base member 10 is provided with a number of recesses 24. It is to be understood that the arm 11 is produced as a one-piece moulding as also is the base member 10, incorporating both the first portion 13 and the second portion 14.

The second portion of the base member is provided with two scales 25 and 26. The scale 25 may be used as a measuring scale, for example, to measure the gap to be filled by the tile to be cut. The scale 26 is used to position the tile in the cutter and it will be seen that it extends from the centre up to 3 inches in one direction and down to 3 inches in the other direction. There is also a further scale 27 which extends from 4¼ inches down to 3 inches over a part of the left-hand side of the second portion. The tool illustrated also includes a scriber 28 which has a hard tungsten tip 29.

When the tool is in use, the tile is placed in position as shown with one edge of the tile being located with the aid of the scale 26 or the scale 27. For cuts up to 3 inches, the right-hand edge of the tile as seen in FIG. 1 is positioned against the right-hand portion of the scale 26. For cuts over 3, inches the left-hand edge of the tile is positioned against the left-hand scale 26 in the case of a 6 inches tile, and against the scale 27 in the case of a 4¼ inches tile. A line is then scribed by means of the tool 28. It is inserted through the slot 20 and drawn along the slot with sufficient pressure to produce the required score. During scribing the tile 15 is held in position by pressing the end 30 of the arm 11 with a pressure of about 2 lb. After scribing, this pressure is increased to about 10 lb to cause the shoulders 18 or 19 to bend the tile about the shoulder 17 and thus cause the tile to snap. In the particular arrangement shown the leverage gives a mechanical advantage of about 2 to 1 when the shoulders 18 are used on a 4¼ inches tile and about 7 to 1 when the shoulders 19 are used on a 6 inches tile. The arcuate shape of the shoulders 18 and 19 ensures that there is always substantially line contact between the shoulders and the tile when the tile is being snapped. This line contact moves along the tile as pressure is increased and helps to ensure that there is a clean break.

The tool illustrated in FIGS. 1 to 3 is suitable for use with tiles having a thickness of ¼ inch or 5/32 inch. The tool is shown arranged for cutting ¼ inch tiles and, when it is to be used with tiles having a thickness of 5/32 inch, the nut is removed from the bolt 12, the bolt is withdrawn and fitted through the hole 31 instead of through the other hole as shown.

The tool illustrated in FIGS. 4, 5 and 6 is intended for cutting tiles of any size but is particularly suitable for cutting tiles which are 6 inches square or larger. The tool illustrated in these Figures is made of metal and is larger than the tool illustrated in FIGS. 1 to 3, but it operates in substantially the same manner as the smaller tool.

The tool illustrated in FIGS. 4, 5 and 6 includes a base member 40 in the form of a length of mild steel having an inverted T-shaped cross-section so that it constitutes a ridge portion 41 upstanding from a base portion 42. A pillar 43 is pinned or welded to the base member. A pivot pin 44, a spring 45 and a washer 46 are located on the pillar 43 between the pivot pin 44 and the base member. The upper part of the pillar 43 is threaded to receive a wing-nut 47 which bears on the pivot pin 44 through a further washer 48. Thus it will be seen that the height of the pivot pin 44 above the ridge portion 41 of the base member can be adjusted by means of the wing-nut 47.

The tool illustrated also includes an arm 50 made of diecast aluminum. The right-hand end of the arm as seen in FIG. 4 is bifurcated to accommodate the pillar 43 and the components assembled thereon, and the pivot pin 44 is received in two holes in parts 51 and 52 of the arm 50. The arm 50 is provided with a central slot 62 located immediately above, and extending parallel to, the ridge portion 41. This slot is intended to receive and guide a scriber 63 having a handle 64 and a hard tungsten tip 65.

The arm 50 is also provided with a pair of dependent shoulders 53 which are curved in the same manner as the two pairs of shoulders 18 and 19 in the embodiment illustrated in FIGS. 1 to 3.

The base member 40 is provided at the end opposite to the pillar 43 with a tail-piece 54 which is secured to the base member by means of two screws 55. The tailpiece is provided with a slot 56 to receive a screw 57 which is fitted in a threaded hole 58 in the arm 50 and secured in position therein by means of a nut 59. A spring 60 and a washer 61 are located on the screw 57 and it will be seen that, when the left-hand end of the arm 50 (as seen in FIG. 6) is depressed, the spring 60 will be compressed and the head of the screw 57 will travel downwardly in the tail-piece 54. When the arm 50 is released, it will return to the position illustrated in FIG. 6, further upward movement being limited by engagement of the head of the screw 57 with the sides of the slot 56.

A plurality of holes 66 are provided in the ridge portion 41 of the base member 40 and any one of these may be used to locate a scale member 67, provided with a shoulder 68 against which a tile 69 can be positioned. The scale member is secured in the desired position along the ridge member 41 by means of a screw 70. A further locating member 71 is fixed to the ridge portion 41 near the pillar 43 by means of a screw 72.

The tool illustrated in FIGS. 4 to 6 is used in the same way as the tool illustrated in FIGS. 1 to 3 except that the scale member 67 is first secured in the correct position in accordance with the size of the tile to be cut and the height of the pivot pin 44 is adjusted by means of the wing-nut 47 in accordance with the thickness of the tile. In this embodiment only one pair of shoulders are provided on the arm since the tile is always located with one edge against the locating member 71 and the scale member 67 is moved to engage the opposite edge of the tile. In the particular embodiment illustrated, the leverage gives a mechanical advantage of about 7 to 1.

What is claimed is:

1. A tile cutter comprising a longitudinally extending base member, an arm hingedly connected to said base member at one end thereof, a ridge upstanding fom a surface of said base member and extending along a portion of said base member from the region of said one end, a slot extending along said arm from the region of the hinge connection, a pair of shoulders dependent from said arm on either side of said slot and extending along a portion of said arm from the region of said hinge connection, and means for maintaining said slot substantially parallel to the ridge on the base member during hinging motion of said arm, wherein the surface of each shoulder adjacent to the base member is in the form of a part of the surface of a right circular cylinder, the axis of which is parallel to the axis of said hinge connection.

2. A tile cutter as claimed in claim 1, wherein the ridge extends along the base member for a distance between one-half and one-third of the length of the base member.

3. A tile cutter as claimed in claim 1, wherein said maintaining means are constituted by a spigot dependent from the region of the end of the arm opposite to said one end and engaging in a corresponding hole in the base member.

4. A tile cutter as claimed in claim 1, wherein the base member incorporates locating means for the tile to be cut.

5. A tile cutter as claimed in claim 4, wherein said locating means include a gauge for indicating the distance of the cut from one or both edges of the tile.

6. A tile cutter as claimed in claim 4, wherein the base member is T-shaped, thus including two mutually perpendicular longitudinally extending portions, the first of which carries the arm which is pivoted to the end of this portion remote from the second portion, while the second portion has an upstanding shoulder which extends perpendicular to the longitudinal axis of the first portion and serves as an abutment for locating the tile to be cut.

7. A tile cutter as claimed in claim 1, wherein the base member and the arm consist of a synthetic resin material and the hinge connection between the arm and the base member is constituted by a metal pin.

8. A tile cutter comprising a longitudinally extending base member, an arm hingedly connected to said base member at one end thereof, a ridge upstanding from a surface of said base member and extending along a portion of said base member from the region on said one end, a slot extending along said arm from the region of the hinge connection, a pair of shoulders dependent from said arm on either side of said slot and extending along a portion of said arm from the region of said hinge connection, and means for maintaining said slot substantially parallel to the ridge on the base member during hinging motion of said arm, wherein said arm has two pairs of shoulders dependent from it, said two pairs of shoulders being spaced from each other along the length of the arm.

9. A tile cutter as claimed in claim 8, wherein said shoulders are curved.

10. A tile cutter as claimed in claim 9, wherein the surface of each shoulder adjacent to the base member is defined by an arc of a circle.

11. A tile cutter comprising a longitudinally extending base member, an arm hingedly connected to said base member at one end thereof, a ridge upstanding from a surface of said base member and extending along a portion of said base member from the region of said one end, a slot extending along said arm from the region of the hinge connection, a pair of shoulders dependent from said arm on either side of said slot and extending along a portion of said arm from the region of said hinge connection, and means for maintaining said slot substantially parallel to the ridge on the base member during hinging motion of said arm, wherein said maintaining means are constituted by a screw fitted into the end of the arm opposite to said one end and slidable through a slot in said base member.

12. A tile cutter as claimed in claim 11, including a spring on said screw serving to urge said arm away from said base member.

13. A tile cutter as claimed in claim 12, wherein the head of said screw serves to limit motion of said arm away from said base member.

14. A tile cutter comprising a longitudinally extending base member, an arm hingedly connected to said base member at one end thereof, a ridge upstanding from a surface of said base member and extending along a portion of said base member from the region on said one end, a slot extending along said arm from the region of the hinge connection, a pair of shoulders dependent from said arm on either side of said slot and extending along a portion of said arm from the region of said hinge connection, and means for maintaining said slot substantially parallel to the ridge on the base member during hinging motion of said arm, wherein the hinge connection is a pivot pin which is insertable in two position in the arm so that the distance between the arm and said one end of the base member can be varied to accommodate tiles of different thicknesses.

15. A tile cutter comprising a longitudinally extending base member, an arm hingedly connected to said base member at one end thereof, a ridge upstanding from a surface of said base member and extending along a portion of said base member from the region of said one end, a slot extending along said arm from the region of the hinge connection, a pair of shoulders dependent from said arm on either side of said slot and entending along a portion of said arm from the region of said hinge connection, and means for maintaining said slot substantially parallel to the ridge on the base member during hinging motion of said arm, wherein the base member consists of metal and has an inverted T-shaped cross-section so that it constitutes a ridge portion upstanding from a base portion.

16. A tile cutter as claimed in claim 15, including a pillar secured to the base member, and a pivot pin, constituting the hinge connection with the arm, adjustably fitted on said pillar.

17. A tile cutter as claimed in claim 16, including a wing-nut threadedly received on the upper part of the pillar and bearing on the pivot pin, and a spring located on the pillar between the pivot pin and the base member.

18. A tile cutter as claimed in claim 15, including a scale member adapted to be secured to said base member by means of a screw passing through any one of a plurality of holes provided in the ridge portion of the base member.

19. A tile cutter as claimed in claim 18, wherein said scale member is provided with a shoulder against which a tile can be positioned.

20. A tile cutter as claimed in claim 19, including locating member fixed to the ridge portion of the base member in the region of said one end thereof, said locating member having a shoulder adapted to receive the opposite edge of a tile from the edge positioned against the shoulder on the scale member.

* * * * *